(12) United States Patent
Fulponi et al.

(10) Patent No.: US 9,608,427 B2
(45) Date of Patent: Mar. 28, 2017

(54) SYSTEMS AND METHODS FOR FORMING A CONDUCTIVE WIRE ASSEMBLY

(71) Applicant: Tyco Electronics Corporation, Berwyn, PA (US)

(72) Inventors: John Anthony Fulponi, Harrisburg, PA (US); Robert Neil Mulfinger, York Haven, PA (US); James Scott Showers, Stewartstown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 29 days.

(21) Appl. No.: 14/597,461

(22) Filed: Jan. 15, 2015

(65) Prior Publication Data

US 2016/0105013 A1    Apr. 14, 2016

Related U.S. Application Data

(60) Provisional application No. 62/062,978, filed on Oct. 13, 2014.

(51) Int. Cl.
| | |
|---|---|
| *H01R 4/20* | (2006.01) |
| *H02G 15/04* | (2006.01) |
| *H01R 43/048* | (2006.01) |
| *H01R 4/18* | (2006.01) |
| *H01R 4/70* | (2006.01) |
| *H01R 11/12* | (2006.01) |
| *H01R 43/28* | (2006.01) |

(52) U.S. Cl.
CPC ........... *H02G 15/043* (2013.01); *H01R 4/183* (2013.01); *H01R 4/20* (2013.01); *H01R 4/70* (2013.01); *H01R 11/12* (2013.01); *H01R 43/048* (2013.01); *H01R 43/28* (2013.01)

(58) Field of Classification Search
CPC ........................................................ H01R 4/20
USPC ........................................................ 174/84 C
See application file for complete search history.

(56) References Cited

U.S. PATENT DOCUMENTS

| 3,955,044 A | 5/1976 | Hoffman et al. |
|---|---|---|
| 5,254,022 A * | 10/1993 | Stuart ...................... H01R 4/20 |
| | | 439/851 |
| 5,393,932 A | 2/1995 | Young et al. |
| 5,749,756 A * | 5/1998 | Vockroth ............... H01R 4/203 |
| | | 174/84 C |

(Continued)

FOREIGN PATENT DOCUMENTS

| FR | 2 620 579 | 3/1989 |
|---|---|---|
| FR | 2 920 599 | 3/2009 |

(Continued)

OTHER PUBLICATIONS

European Search Report, Mail Date, Dec. 23, 2015, EP 15 18 9169, Application No. 15189169.4-1801.

*Primary Examiner* — Chau N Nguyen

(57) ABSTRACT

A shuttle assembly is configured to connect an insulated wire to a contact terminal. The shuttle assembly may include a connecting insert defining an exposed wire-crimping chamber. The connecting insert is configured to receive an exposed end of a conductive wire, and is configured to be crimped to the exposed end of the conductive wire. A seal member is connected to the connecting insert, and is configured to be crimped to an insulating cover of the insulated wire.

16 Claims, 6 Drawing Sheets

(56) References Cited

U.S. PATENT DOCUMENTS

| 7,695,331 B2* | 4/2010 | Kerner | H01R 4/20 |
| | | | 174/15.6 |
| 2010/0200261 A1 | 8/2010 | Boutot | |
| 2013/0130569 A1* | 5/2013 | Sato | H01R 4/206 |
| | | | 439/882 |

FOREIGN PATENT DOCUMENTS

| GB | 755 272 A | 8/1956 |
| JP | 2014 164847 A | 9/2014 |

\* cited by examiner

SYSTEMS AND METHODS FOR FORMING A CONDUCTIVE WIRE ASSEMBLY

RELATED APPLICATIONS

This application relates to and claims priority benefits from U.S. Provisional Patent Application No. 62/062,978 entitled "Systems and Methods for Forming a Conductive Wire Assembly," filed Oct. 13, 2014, which is hereby incorporated by reference in its entirety.

BACKGROUND OF THE DISCLOSURE

Embodiments of the present disclosure generally relate to systems and methods for forming a conductive wire assembly.

Conductive wire assemblies are used to provide power and/or data signals between various components. A typical conductive wire assembly includes an insulating cover that surrounds portions of a conductive wire. A distal end of the insulating cover may be stripped in order to expose a portion of the conductive wire so that the exposed portion of the conductive wire may contact conductive portions of a contact terminal, for example.

In order to electrically and mechanically connect a conductive wire assembly to a contact terminal, portions of the conductive wire assembly and the contact terminal may be crimped together. One known method crimps an outer housing of the contact terminal with the conductive wire of the conductive wire assembly in order to provide a conductive electrical connection therebetween. Additionally, a separate seal is crimped around the insulating cover in order to provide a fluid tight (for example, air-tight and gas-tight) seal that prevents water or moisture from infiltrating into the conductive interface between the conductive wire and the contact terminal. As such, the process of connecting the conductive wire assembly to the contact terminal includes two separate and distinct crimping operations.

Another known method crimps a conductive wire to a housing of a contact terminal and then heat shrinks a separate seal around the insulating wire. This method also provides two separate and distinct steps, namely, a crimping operation and a heat-shrinking operation.

As can be appreciated, known methods of connecting a conductive wire to a contact terminal may be time and labor intensive. For example, in using multiple forming operations, such as multiple crimping and/or crimping and heat-shrinking operations, time and cost is added to the manufacturing process. Accordingly, a need exists for a simpler and more efficient system and method for connecting a conductive wire assembly to a contact terminal.

BRIEF DESCRIPTION OF THE DISCLOSURE

Certain embodiments of the present disclosure provide a shuttle assembly configured to connect an insulated wire to a contact terminal. The shuttle assembly may include a connecting insert defining an exposed wire-crimping chamber. The connecting insert is configured to receive an exposed end of a conductive wire, and is configured to be crimped to the exposed end of the conductive wire. A seal member may be connected to the connecting insert. The seal member is configured to be crimped to an insulating cover of the insulated wire. In at least one embodiment, a single crimp crimps the connecting insert to the exposed end of the conductive wire and the seal member to the insulating cover. The connecting insert may be integrally formed with the seal member.

In at least one embodiment, the shuttle assembly is configured to connect to the insulated wire to form a conductive wire assembly before connecting to the contact terminal. In at least one other embodiment, the shuttle assembly is configured to be inserted into a crimping chamber of a contact terminal before connecting to the insulated wire.

The connecting insert may include a cylindrical wall connected to an end cap. The exposed wire-crimping chamber may be defined between the cylindrical wall and the end cap. A plurality of openings may be formed through one or both of the cylindrical wall or the end cap.

The connecting insert may include a wire-connection confirmation lever that is positioned within a channel formed through a portion of the main body. In at least one embodiment, the wire-connection confirmation lever may include a flexible root that flexibly connects to the main body, an inwardly-canted beam that connects to the flexible root, wherein the inwardly-canted beam extends into the exposed wire-crimping chamber toward a longitudinal axis, and a linear extension beam that connects to the inwardly-canted beam. The linear extension beam may outwardly angle away from the longitudinal axis. The linear extension beam is flush or below an outer wall portion of the main body when the insulated wire is properly connected to the connecting insert. At least a portion of the linear extension beam outwardly extends beyond the outer wall portion of the main body when the insulated wire is improperly connected to the connecting insert.

In at least one embodiment, the connecting insert may include a connection window formed through a portion of a main body. An exposed end of the conductive wire is visible through the connection window when the insulated wire is properly connected to the connecting insert.

Certain embodiments of the present disclosure provide a method of securely connecting a conductive wire assembly to a contact terminal. The method may include inserting a distal end of a conductive wire into an exposed wire-crimping chamber of a connecting insert, viewing the distal end of the conductive wire through a connection window formed through the connecting insert, removing the conductive wire from the exposed wire-crimping chamber of the connecting insert when an insulating cover is visible through the connection window, determining if at least a portion of a wire connection confirmation lever extends outwardly past an outer wall portion of the connecting insert, removing the conductive wire from the exposed wire-crimping chamber of the connecting insert when the at least a portion of the wire connection confirmation lever extends outwardly past the outer wall portion of the connecting insert, and crimping the contact terminal to the conductive wire assembly in response to the exposed wire-crimping chamber being visible through the connection window and the wire connection confirmation lever being flush with or below an outer wall portion of the connecting insert.

DETAILED DESCRIPTION OF THE DISCLOSURE

Figure 1:
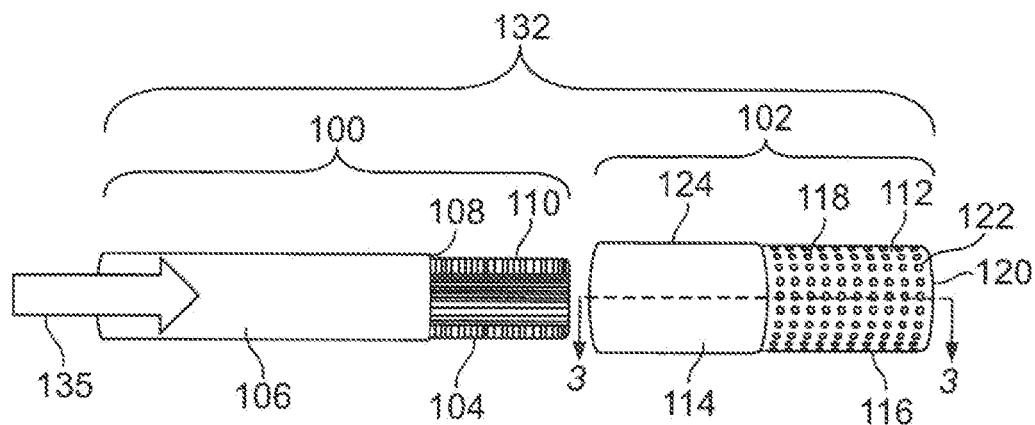
FIG. 1 illustrates a lateral view of an insulated wire aligned with a shuttle assembly, according to an embodiment of the present disclosure.

FIG. 1 illustrates a lateral view of an insulated wire 100 aligned with a shuttle assembly 102, according to an embodiment of the present disclosure. The insulated wire 100 includes an internal conductive wire 104 that is covered by an insulating cover 106. The conductive wire 104 may be formed of a conductive metal, such as copper, aluminum, or the like. The insulating cover 106 may be formed of an insulating material, such as rubber, plastic, or the like. A portion of the insulating cover 106 at an end 108 is stripped in order to expose an end 110 of the conductive wire 104.

The shuttle assembly 102 may include a connecting insert 112 integrally connected to a seal member 114. The connecting insert 112 may provide an oxide-permeating mesh structure. For example, during a crimping operation, the oxide-permeating mesh structure may break through aluminum oxides of the exposed end 110 of the conductive wire 104. The connecting insert 112 may include a main body 116 having an exterior wall, such as a cylindrical wall 118, connected to an end cap 120. An exposed wire-crimping chamber may be defined between the cylindrical wall 118 and the end cap 120. As shown, the cylindrical wall 118 may include a plurality of openings 122, such as holes, perforations, slots, or the like. Additional openings 122 may be formed through the end cap 120, as well.

The seal member 114 may be a sealing sleeve, such as formed of rubber, silicone rubber, or the like, that is secured over an outer portion of an end of the connecting insert 112 that is opposite from the end cap 120. The seal member 114 includes a main wall 124 that defines an internal passage therethrough. The internal passage is open at both ends of the seal member 114.

The shuttle assembly 102 may be formed as an integral piece. For example, the seal member 114 may be slid onto an end of the connecting insert 112 and secured thereto through an interference fit. Optionally, the seal member 114 may be adhesively secured to the connecting insert 112. In at least one embodiment, the connecting insert 112 may include one or more detent members that snapably engage reciprocal member(s) of the seal member 114. In at least one embodiment, the seal member 114 may be overmolded onto an end of the connecting insert 112. In at least one other embodiment, fluid sealing material may be deposited on end of the connecting insert 112 and then cooled to form the seal member 114. The shuttle assembly 102 may be formed as a single piece, and shipped to an end user.

Figure 2:
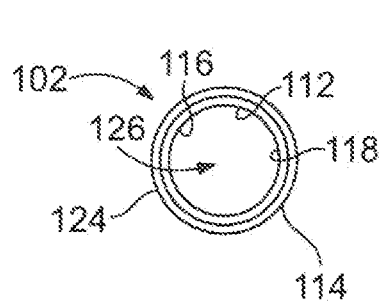
FIG. 2 illustrates a wire-receiving end view of a shuttle assembly, according to an embodiment of the present disclosure.
Figure 3:
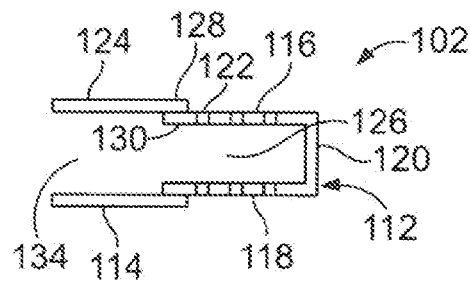
FIG. 3 illustrates a transverse cross-sectional view of a shuttle assembly through line 3-3 of FIG. 1, according to an embodiment of the present disclosure.

FIG. 2 illustrates a wire-receiving end view of the shuttle assembly 102, according to an embodiment of the present disclosure. FIG. 3 illustrates a transverse cross-sectional view of the shuttle assembly 102 through line 3-3 of FIG. 1, according to an embodiment of the present disclosure. Referring to FIGS. 2 and 3, the exposed wire-crimping chamber 126 is defined within the connecting insert 112. A proximal end 128 of the seal member 114 is secured onto a distal end 130 of the connecting insert 112. The distal end 130 is opposite the end cap 120.

Referring to FIGS. 1-3, the insulating cover 106 of the insulated wire 100 is stripped to expose the end 110 of the conductive wire 104 such that the exposed end 110 is sized and shaped to be inserted into the exposed wire-crimping chamber 126 of the shuttle assembly 102. To form a conductive wire assembly 132, the insulated wire 100 is axially aligned with the shuttle assembly 102 and urged into the internal passage 134 of the seal member 114 in the direction of arrow 135 until the exposed end 110 of the conductive wire 104 is within exposed wire-crimping chamber 126, and the end 108 of the insulating cover 106 is covered by the seal member 114. Alternatively, the shuttle assembly 102 may be urged onto the insulated wire 100 in a direction that is opposite to the direction of arrow 135. The end cap 120 provides a positive stop that prevents the insulated wire 100 from being further urged in the direction of arrow 135.

Figure 4:
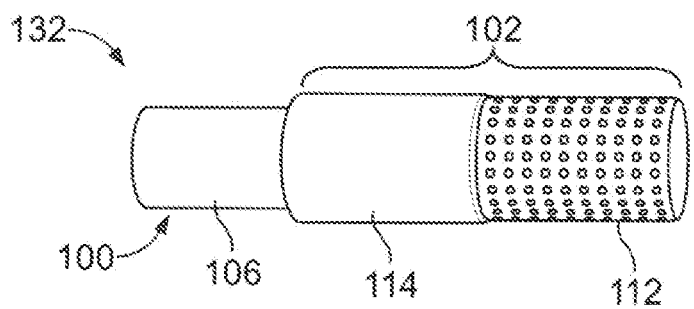
FIG. 4 illustrates a perspective view of a conductive wire assembly, according to an embodiment of the present disclosure.

FIG. 4 illustrates a perspective view of the conductive wire assembly 132, according to an embodiment of the present disclosure. Referring to FIGS. 1-4, the formed conductive wire assembly 132 includes the exposed end 110 of the conductive wire 104 positioned within the exposed wire-crimping chamber 126 of the shuttle assembly 102 and the seal member 114 positioned around the end 108 of the insulating cover 106. The conductive wire assembly 132 is then inserted into a crimping chamber of a contact terminal to crimp the contact terminal to the conductive wire assembly 132, such as through a single crimping operation. Optionally, instead of positioning the shuttle assembly 102 onto the insulated wire 100 to form the conductive wire assembly 132, the shuttle assembly 102 may first be positioned within a crimping chamber of a contact terminal, and then the insulated wire may be urged into shuttle assembly 102, as described above.

Figure 5:
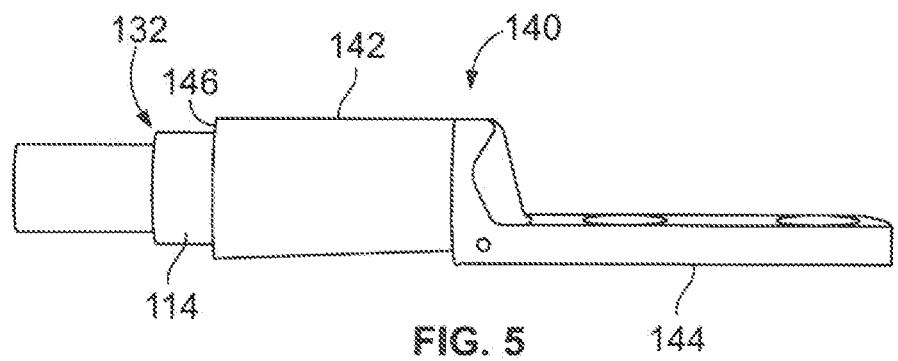
FIG. 5 illustrates a lateral view of a conductive wire assembly connected to a contact terminal, according to an embodiment of the present disclosure.

FIG. 5 illustrates a lateral view of the conductive wire assembly 132 connected to a contact terminal 140, according to an embodiment of the present disclosure. The contact terminal 140 may include a main housing 142 connected to a base 144, such as a flat strap, panel, tab, or the like, which is configured to be electrically and mechanically connected to a component, device, or the like. The main housing 142 includes a crimping chamber that connects to or includes an insert passage 146. The shuttle assembly 102, such as shown in FIGS. 1-4, is inserted into the crimping chamber. A crimping tool is then used to crimp the main housing 142 to the conductive wire assembly 132. During the crimping operation, the main housing 142 is crimped to the connecting insert 112 such that internal walls that define the crimping chamber compress into the connecting insert 112, which therefore compresses into the exposed end 110 of the conductive wire 104. During the crimping operation, portions of the exposed end 110 of the conductive wire 104 may squeeze through the openings 122 of the connecting insert 112 and contact the internal wall portions of the main housing 142. Accordingly, the crimping operation provides an electrical path between the exposed end 110 of the conductive wire 104 and the main housing 142, whether directly through contact between portions of the exposed end 110 that are squeezed through the openings 122, and/or through an intermediary contacting medium, such as the connecting insert 112.

The crimping tool also securely crimps an internal portion of the main housing 142 to the seal member 114, which, in turn, crimps around the end 108 of the insulating cover 106, thereby providing a fluid-tight seal therebetween. Accordingly, a single crimping operation may electrically and mechanically connect the contact terminal to the insulated wire 100 and, at the same time, provide a fluid-tight seal between the contact terminal 140 and the insulated wire 100, as well as a fluid-tight seal between the seal member 114 and the insulating cover 106.

Figure 6:
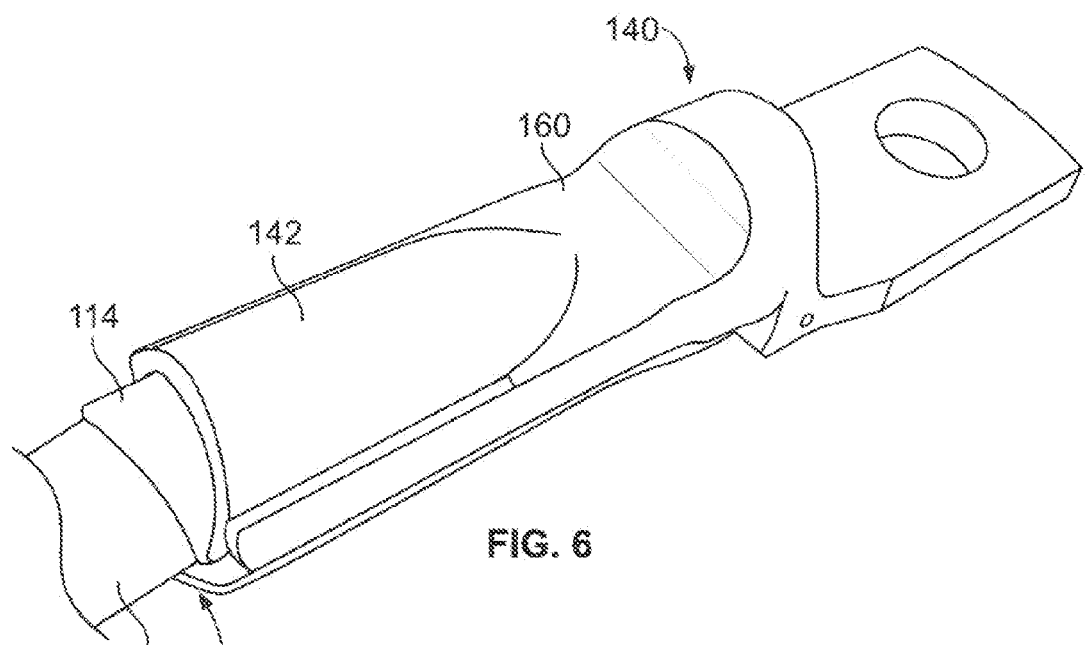
FIG. 6 illustrates a perspective top view of a contact terminal crimped to a conductive wire assembly, according to an embodiment of the present disclosure.

FIG. 6 illustrates a perspective top view of the contact terminal 140 crimped to the conductive wire assembly 132, according to an embodiment of the present disclosure. A crimping tool is operated to form a crimp 160 at an area that compressively crimps the main housing 142 to the connecting insert 112 (shown in FIGS. 1-4), which, in turn, crimps the connecting insert 112 to the exposed end 110 of the conductive wire 104 (shown in FIG. 1), as well as compressively crimps a portion of the main housing 142 to the seal member 114, which, in turn, compressively crimps a portion of the seal member 114 to the insulating cover 106.

Figure 7:
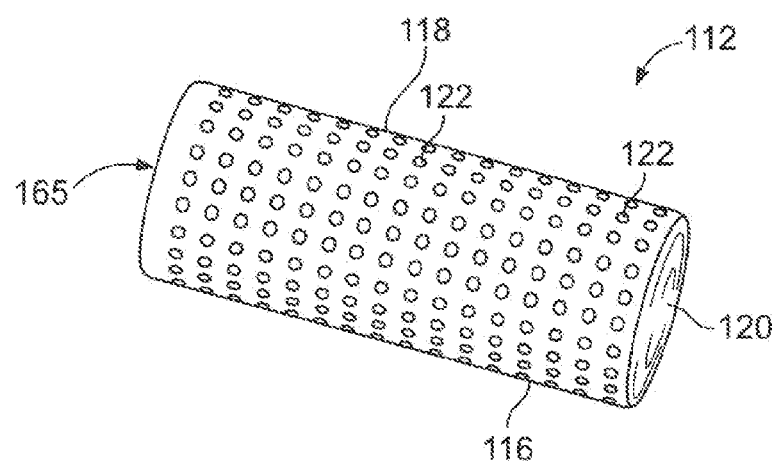
FIG. 7 illustrates a perspective view of a connecting insert, according to an embodiment of the present disclosure.

FIG. 7 illustrates a perspective view of the connecting insert 112, according to an embodiment of the present disclosure. As described above, the connecting insert 112 may include the main body 116 having the cylindrical wall 118 connected to the end cap 120. An open end 165 is opposite from the end cap 120. The exposed wire-crimping chamber 126 connects to the open end 165 and is defined between the cylindrical wall 118 and the end cap 120. As shown, the cylindrical wall 118 may include the plurality of openings 122, such as holes, perforations, slots, or the like. Optionally, instead of or in addition to the openings, protrusions may extend inwardly (toward the conductive wire) and/or outwardly (away from the conductive wire) from the cylindrical wall 118. Additional openings 122 may be formed through the end cap 120, as well. As noted above, when the connecting insert 112 is crimped into an exposed end of a conductive wire, portions of the conductive wire may squeeze through the openings 122. Optionally, the connecting insert 112 may include more or less openings 122 than shown. Also, alternatively, the connecting insert 112 may not include the openings 122. Further, the connecting insert 112 may not include the end cap 120. Instead, both ends of the connecting insert 112 may be open.

Figure 8:
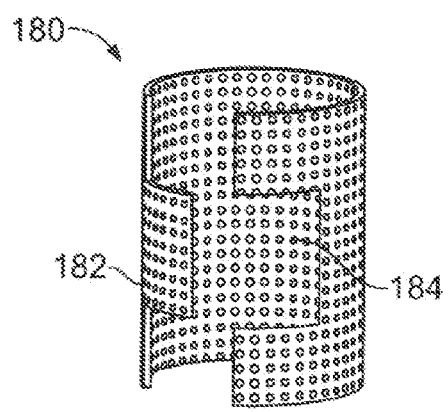
FIG. 8 illustrates a perspective view of a connecting insert, according to an embodiment of the present disclosure.

FIG. 8 illustrates a perspective view of a connecting insert 180, according to an embodiment of the present disclosure. The connecting insert 180 may be used with any of the embodiments of the present disclosure. The connecting insert 180 may be formed from a planar sheet that is rolled. One end of the connecting insert 180 may include a tab 182 that is configured to fit into a reciprocal slot 184 formed through an opposite end. In this manner, the connecting insert 180 may form a cylindrical sleeve, and a seal member may fit over a portion of the connecting insert 180 to securely maintain the shape.

Figure 9:
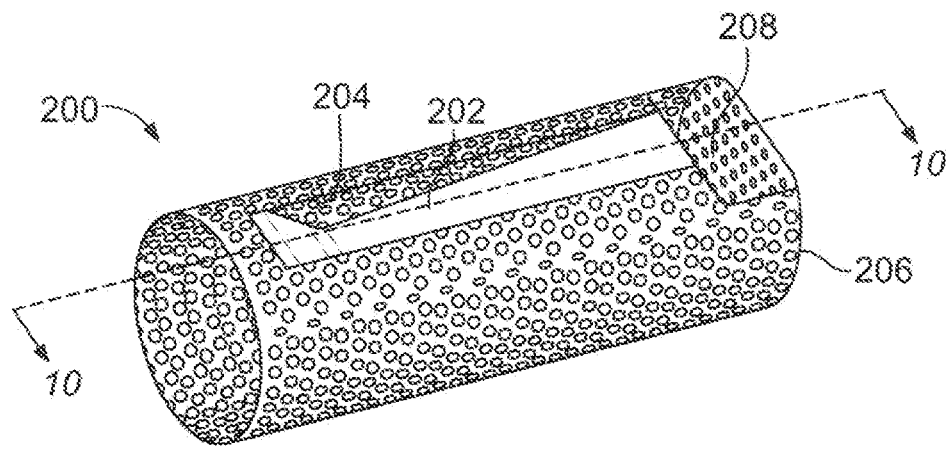
FIG. 9 illustrates a perspective top view of a connecting insert, according to an embodiment of the present disclosure.

FIG. 9 illustrates a perspective top view of a connecting insert 200, according to an embodiment of the present disclosure. The connecting insert 200 may be used with any of the embodiments of the present disclosure. A seal member, such as described above, may be secured to an end of the connecting insert 200, as described above, to form a shuttle assembly.

The connecting insert 200 is similar to those described above, except that a wire-connection confirmation lever 202 is flexibly positioned within a channel 204 formed through a main body 206. A connection window 208 is formed at an end of the channel 204. The wire-connection confirmation lever 202 may not extend into the connection window 208. Alternatively, a portion of the wire-connection confirmation lever 202 may extend into the connection window 208. Each of the wire-connection confirmation lever 202 and the connection window 208 provide features that allow an individual to determine whether or not a conductive wire is properly connected to the connecting insert 200 before a crimping operation. As such, the wire-connection confirmation lever 202 and the connection window 208 provide redundant connection indicators.

While one confirmation lever 202 is shown, more than one confirmation lever 202 may be used. For example, a plurality of confirmation levers may be axially spaced about the main body 206. Further, a single radial confirmation lever in the form of a resilient rim may radially extend around at least a portion of the main body 206.

While one connection window 208 is shown, more than one connection window 208 may be used. For example, a plurality of connection windows 208 may be axially spaced about the main body 206. Further, a single connection window 208 may radially extend around at least a portion of the main body 206.

Figure 10:
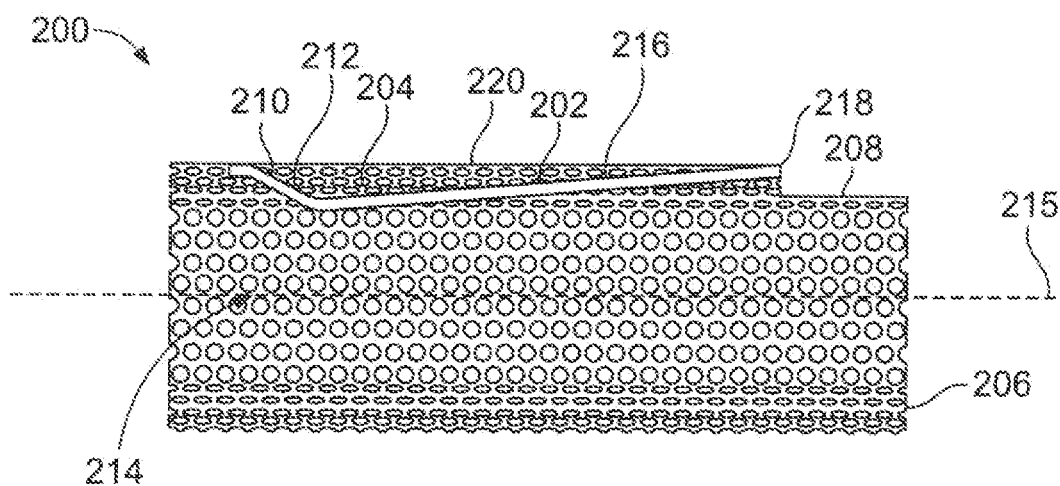
FIG. 10 illustrates a transverse cross-sectional view of a connecting insert, according to an embodiment of the present disclosure.

FIG. 10 illustrates a transverse cross-sectional view of the connecting insert 200, according to an embodiment of the present disclosure. The wire-connection confirmation lever 202 includes a flexible root 210 that is resiliently and flexibly connected to the main body 206. The root 210 connects to an inwardly-canted beam 212 (in that the beam 212 inwardly cants toward a longitudinal axis) that extends into an exposed wire-crimping chamber 214 towards a longitudinal axis 215 of the connecting insert 200. The beam 212, in turn, connects to a linear extension beam 216 that outwardly angles away from the longitudinal axis 215 (for example, angles outwardly away from the connection with the beam 212 to a distal tip 218). A distal tip 218 of the extension beam 216 is positioned below or in line with an outer wall portion 220 of the main body 206 in an at-rest, non-deflected state. For example, in the at-rest or non-deflected state, the distal tip 218 does not outwardly extend past (for example, above) the outer wall portion 220 of the main body 206.

Figure 11:
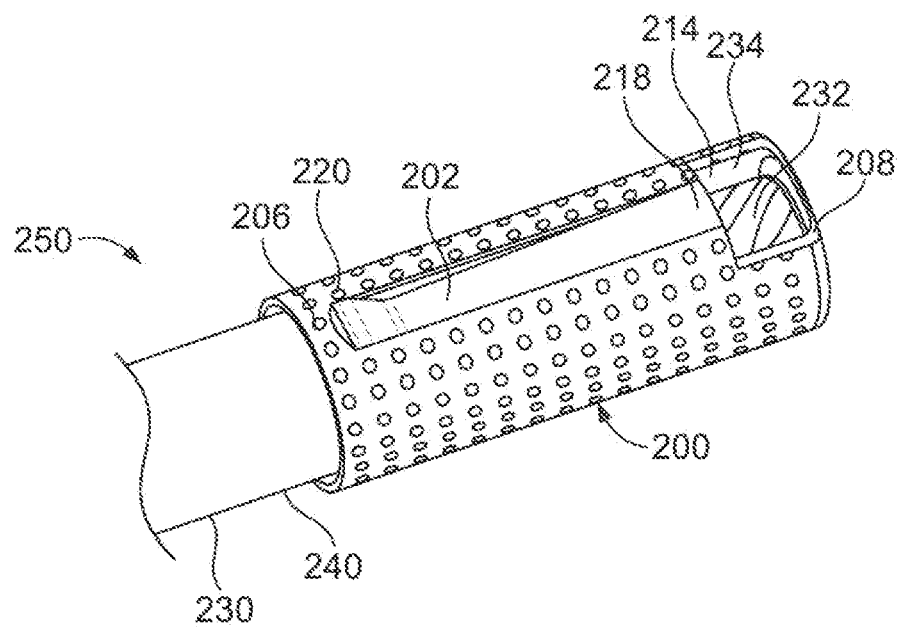
FIG. 11 illustrates a perspective top view of a connecting insert secured over a portion of an insulated wire, according to an embodiment of the present disclosure.

FIG. 11 illustrates a perspective top view of the connecting insert 200 secured over a portion of an insulated wire 230, according to an embodiment of the present disclosure. While not shown, a seal member may connect to the connecting insert 200 to form a shuttle assembly, as described above. Further, perforations may be formed through the insert 200, and/or protrusions may outwardly extend from the insert 200.

In operation, the wire-connection confirmation lever 202 and the connection window 208 are used to confirm that an exposed end 232 of a conductive wire 234 of the insulated wire 230 is positioned within the exposed wire-crimping chamber 214 of the connecting insert 200. For example, when the connecting insert 200 is crimped into the exposed end 232 of the conductive wire 234, a conductive electrical connection is formed therebetween. However, if the connecting insert 200 is crimped into an insulating cover 240, but not any exposed conductive portion, of the insulated wire, the connecting insert 200 may mechanically connect to the insulated wire 230, but may not provide a conductive electrical connection therebetween. The connection window 208 and the wire-connection confirmation lever 202 provide visual and/or tactile indications that inform an individual as to whether or not the insulated wire 230 is properly inserted within the connecting insert 200 before crimping.

For example, an individual can view the insulated wire 230 through the connection window 208. If the exposed end 232 of the conductive wire 234 is visible through the window 208, then an individual may determine that the conductive wire assembly 250 is ready for crimping. If, however, the insulating cover 240 is visible through the window 208, then the conductive wire assembly 250 is not ready for crimping. Instead, the insulated wire 230 is to be removed and a portion of the insulating cover 240 is to be stripped to expose a portion of the conductive wire 234.

Additionally, if the distal tip 218 of the lever 202 extends above a tangential surface of the outer wall portion 220 of the main body 206, the lever 202 provides a visible and/or tactile indication that the insulating cover 240 is improperly inserted into the connecting insert 200. For example, the individual may see that the distal tip 218 extends above a tangential surface of the outer wall portion 220, and/or may feel that the distal tip 218 extends above the tangential surface of the outer wall portion 220, as described below.

Figure 12:
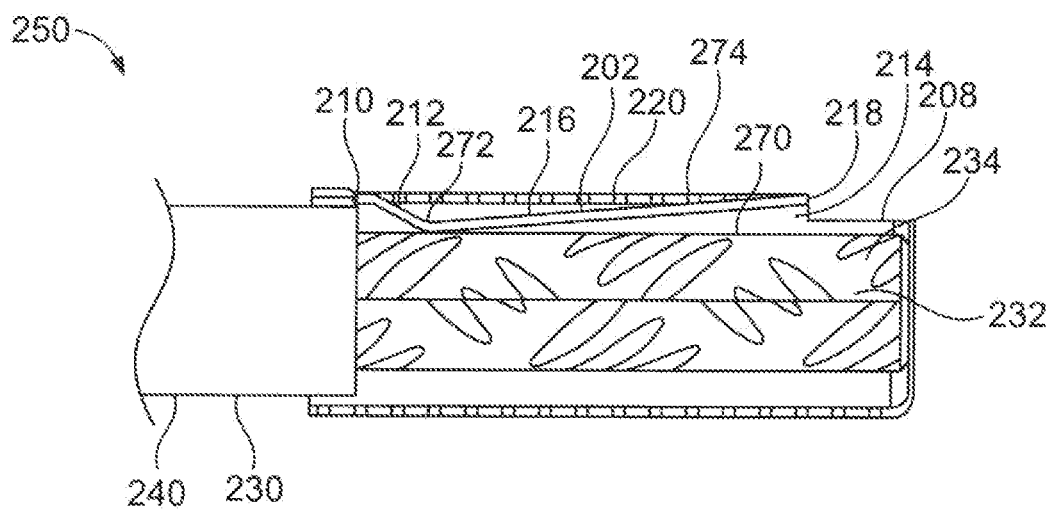
FIG. 12 illustrates an internal view of a conductive wire assembly, according to an embodiment of the present disclosure.

FIG. 12 illustrates an internal view of the conductive wire assembly 250, according to an embodiment of the present disclosure. As shown in FIG. 12, the insulated wire 230 is properly inserted into the exposed wire-crimping chamber 214. The lever 202 may be separated from or directly contact an outer diameter 270 of the exposed end 232 of the conductive wire 234. The inwardly-canted beam 212 is angled so that when an apex 272 (that connects the beam 212 to the extension beam 216) of the lever 202 contacts the outer diameter 270, the distal tip 218 does not extend past a tangential surface 274 of the outer wall portion 220 of the main body 206. Further, as shown, a portion of the exposed end 232 is visible through the window 208.

Figure 13:
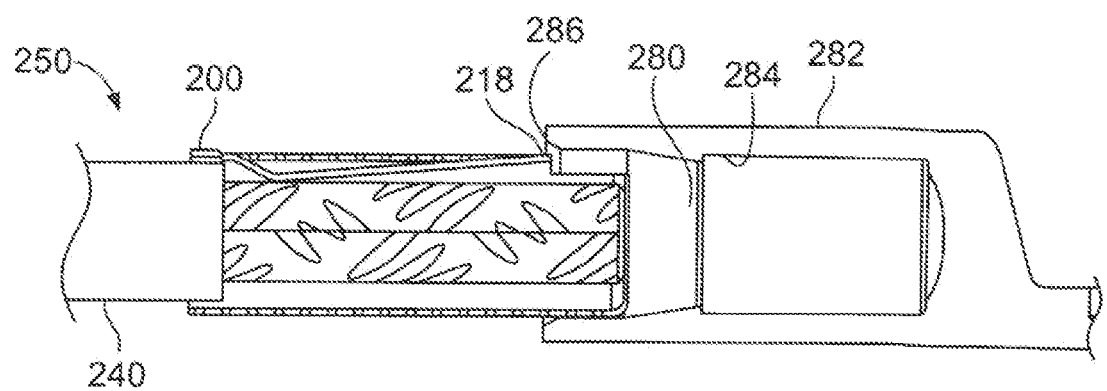
FIG. 13 illustrates an internal view of a conductive wire assembly being inserted into a crimping chamber of a contact terminal, according to an embodiment of the present disclosure.

FIG. 13 illustrates an internal view of the conductive wire assembly 250 being inserted into a crimping chamber 280 of a contact terminal 282, according to an embodiment of the present disclosure. The crimping chamber 280 is defined by internal walls 284 that connect to a receiving rim 286. As shown in FIG. 13, the insulated wire 230 is properly connected to the connecting insert 200 such that the lever 202 does not extend outwardly past (for example, above, as shown in FIG. 13) the outer wall portion 220. As such, the distal tip 218 does not abut into the receiving rim 286 as the conductive wire assembly 250 is inserted into the crimping chamber 280. Therefore, the conductive wire assembly 250 is freely and easily inserted into the crimping chamber 280 without the distal tip 218 snagging onto the receiving rim 286 and preventing or otherwise hindering insertion.

Figure 14:
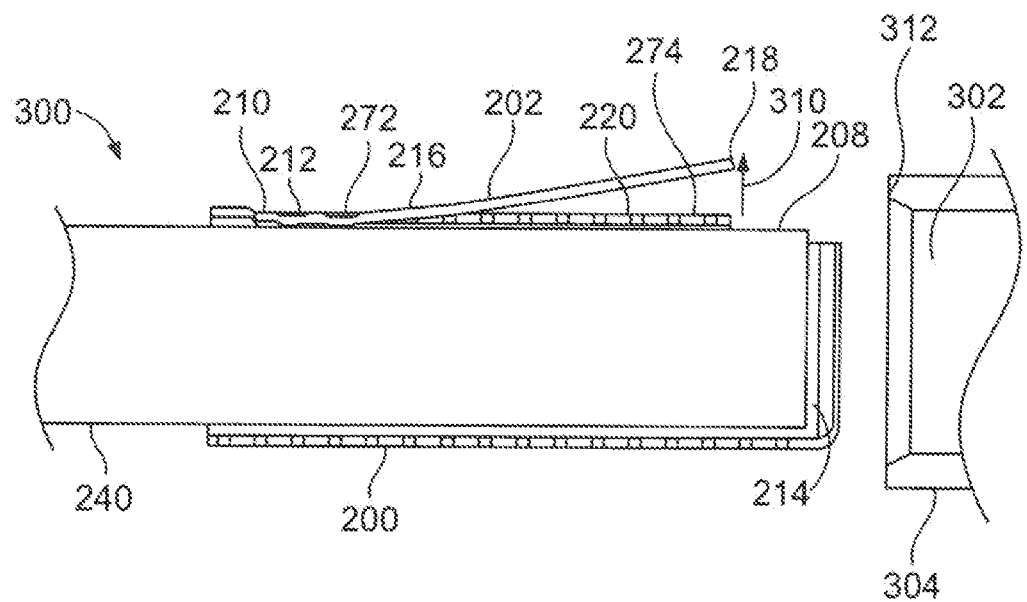
FIG. 14 illustrates an internal view of an improperly formed conductive wire assembly aligned with a crimping chamber of a contact terminal, according to an embodiment of the present disclosure.

FIG. 14 illustrates an internal view of an improperly formed conductive wire assembly 300 aligned with a crimping chamber 302 of a contact terminal 304, according to an embodiment of the present disclosure. As shown, the insulating cover 240 of the insulated wire 230 is not stripped. As such, the insulating cover 240 is visible through the window 208, thereby providing an initial visible indication to an individual that the assembly 300 is not ready to be crimped. Additionally, as the insulating cover 240 passes into the exposed wire-crimping chamber 214, the apex 272 abuts into the outer surface of the insulating cover 240, which deflects the lever 202 upwardly in the direction of arrow 310, such that the distal tip 218 is moved outwardly past the tangential surface 274 of the outer wall portion 220. In this position, if the conductive wire assembly 250 is urged toward the crimping chamber 302, the outwardly flared lever 202 abuts into the contact terminal 304, such as by the distal tip 218 snagging onto the receiving rim 312, which prevents or otherwise hinders the conductive wire assembly 250 from passing into the crimping chamber 302.

Figure 15:
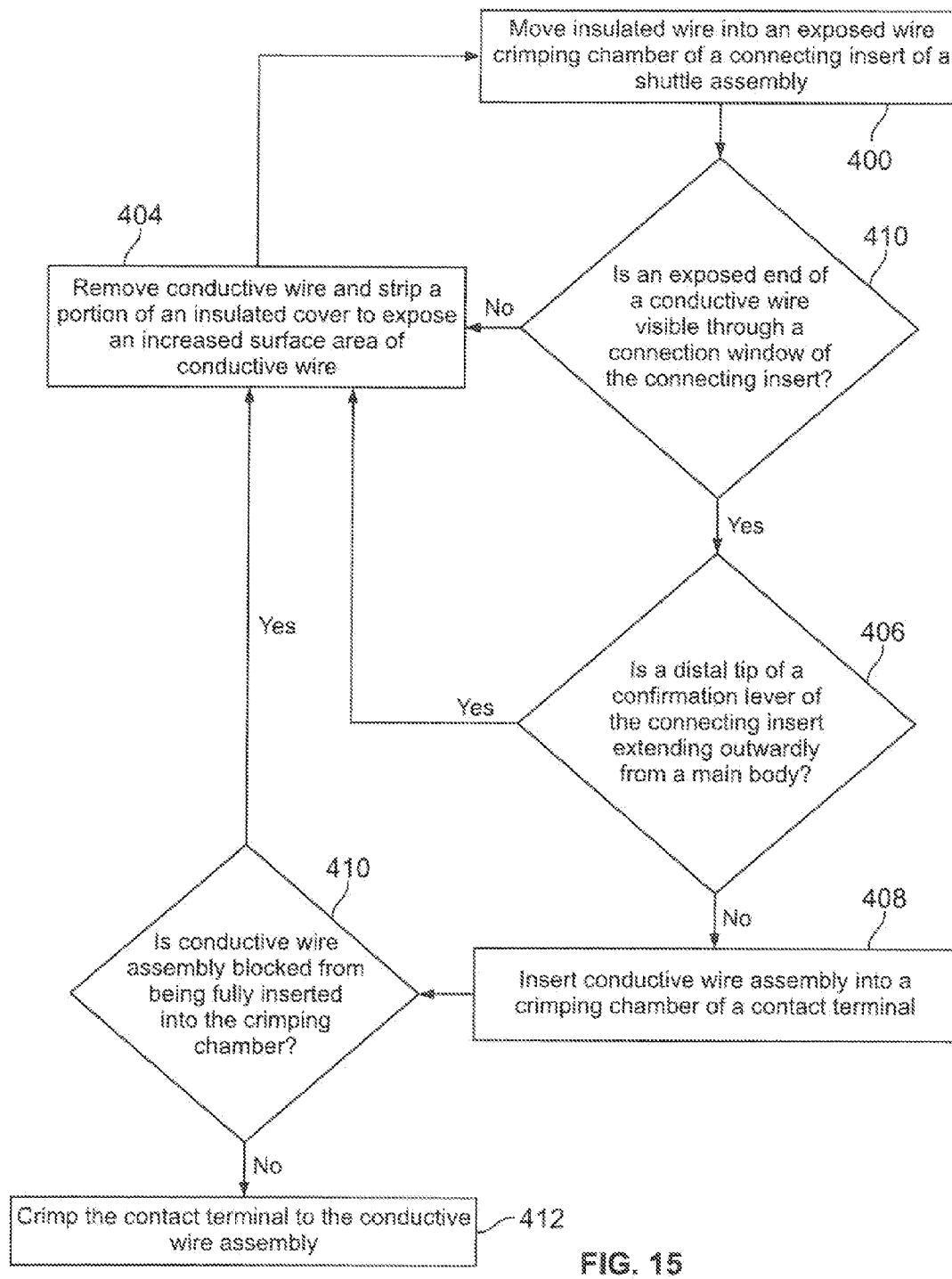
FIG. 15 illustrates a flow chart of a method of securing a conductive wire assembly to a contact terminal, according to an embodiment of the present disclosure.

FIG. 15 illustrates a flow chart of a method of securing a conductive wire assembly to a contact terminal, according to an embodiment of the present disclosure. After an individual strips an insulated wire to expose a conductive portion, the method begins at 400, in which an insulated wire is moved into an exposed wire-crimping chamber of a connecting insert of a shuttle assembly. At 402, it is determined if an exposed end of a conductive wire of the insulated wire is visible through a connection window of the connecting insert. If not, the process continues to 404, in which the conductive wire is removed from the connecting insert and a portion of an insulated cover is stripped to expose an increased surface area of the conductive wire, and the process returns to 400.

If, however, the exposed end of the conductive wire is exposed through the connection window, the process moves to 406, in which it is determined if a distal tip of a confirmation lever of the connecting insert extends outwardly from a main body. For example, an individual may visually determine whether or not the distal tip extends outwardly from the main body. As another example, the individual may feel the connecting insert to determine if the distal tip is extending past the main body (for example, if the individual feels the distal tip, then he/she knows that the distal tip is extending outwardly past the main body). If the distal tip is extending past the main body, the process continues to 404. If, however, the individual does not determine through sight or touch that the distal tip extends past the main body, the process continues to 408, in which the conductive wire assembly is inserted into a crimping chamber of a contact terminal.

As the conductive wire assembly is inserted into the crimping chamber, it is determined if the conductive wire assembly is blocked from being fully inserted into the crimping chamber at 410. For example, the individual may have neglected to visually inspect the connection at 402 and 406, or may have perfunctorily done so. If the conductive wire assembly is blocked or hindered from full insertion, such as by a distal tip of a lever of a connecting insert snagging on a portion of the contact terminal, the process continues to 404. If, however, the conductive wire assembly is not blocked from full insertion, the process continues to 412, in which the contact terminal is crimped to the conductive wire assembly.

Referring to FIGS. 1-15, embodiments of the present disclosure provide simple and efficient systems and methods for securely connecting a conductive wire assembly to a contact terminal. Further, embodiments of the present disclosure provide systems and methods for forming a conductive wire assembly that may be connected to a contact terminal.

While various spatial terms, such as upper, bottom, lower, mid, lateral, horizontal, vertical, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosure without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112(f), unless and until such claim limitations expressly use the phrase "means for" followed by a statement of function void of further structure.

What is claimed is:

1. A shuttle assembly configured to connect an insulated wire to a contact terminal, the shuttle assembly comprising:
   a connecting insert defining an exposed wire-crimping chamber, wherein the connecting insert is configured to receive an exposed end of a conductive wire, and wherein the connecting insert is configured to be crimped to the exposed end of the conductive wire, wherein the connecting insert comprises: (a) an exterior wall connected to an end cap, wherein the exposed wire-crimping chamber is defined between the exterior wall and the end cap, and wherein one or both of a plurality of openings are formed through or a plurality of protrusions extend from one or both of the exterior wall or the end cap, (b) a connection window formed through a portion of the exterior wall, wherein an exposed end of the conductive wire is visible through the connection window when the insulated wire is properly connected to the connecting insert, (c) a wire-connection confirmation lever that is positioned within a channel formed through a portion of a main body of the connecting insert, wherein the wire-connection confirmation lever comprises: (i) a flexible root that flexibly connects to the main body; (ii) an inwardly-canted beam that connects to the flexible root, wherein the inwardly-canted beam extends into the exposed wire-crimping chamber toward a longitudinal axis; and (iii) a linear extension beam that connects to the inwardly-canted beam, wherein the linear extension beam outwardly angles away from the longitudinal axis; and
   a seal member connected to the connecting insert, wherein the seal member is configured to be crimped to an insulating cover of the insulated wire.

2. The shuttle assembly of claim 1, wherein a single crimp crimps the connecting insert to the exposed end of the conductive wire and the seal member to the insulating cover.

3. The shuttle assembly of claim 1, wherein the connecting insert is integrally formed with the seal member.

4. The shuttle assembly of claim 1, wherein the shuttle assembly is configured to connect to the insulated wire to form a conductive wire assembly before connecting to the contact terminal.

5. The shuttle assembly of claim 1, wherein the shuttle assembly is configured to be inserted into a crimping chamber of a contact terminal before connecting to the insulated wire.

6. The shuttle assembly of claim 1, wherein the linear extension beam is flush or below an outer wall portion of the main body when the insulated wire is properly connected to the connecting insert, and wherein at least a portion of the linear extension beam outwardly extends beyond the outer wall portion of the main body when the insulated wire is improperly connected to the connecting insert.

7. A shuttle assembly configured to connect an insulated wire to a contact terminal, the shuttle assembly comprising:
   a connecting insert defining an exposed wire-crimping chamber, wherein the connecting insert is configured to receive an exposed end of a conductive wire, and wherein the connecting insert is configured to be crimped to the exposed end of the conductive wire, wherein the connecting insert comprises a wire-connection confirmation lever that is positioned within a channel formed through a portion of a main body of the connecting insert, wherein the wire-connection confirmation lever comprises (a) a flexible root that flexibly connects to the main body, (b) an inwardly-canted beam that connects to the flexible root, wherein the inwardly-canted beam extends into the exposed wire-crimping chamber toward a longitudinal axis, and (c) a linear extension beam that connects to the inwardly-canted beam, wherein the linear extension beam outwardly angles away from the longitudinal axis, wherein the linear extension beam is flush or below an outer wall portion of the main body when the insulated wire is properly connected to the connecting insert, and wherein at least a portion of the linear extension beam outwardly extends beyond the outer wall portion of the main body when the insulated wire is improperly connected to the connecting insert; and
   a seal member connected to the connecting insert, wherein the seal member is configured to be crimped to an insulating cover of the insulated wire.

8. The shuttle assembly of claim 7, wherein the connecting insert comprises an exterior wall connected to an end cap, wherein the exposed wire-crimping chamber is defined between the exterior wall and the end cap, and wherein one or both of a plurality of openings are formed through or a plurality of protrusions extend from one or both of the exterior wall or the end cap.

9. The shuttle assembly of claim 7, wherein the connecting insert comprises a connection window formed through a portion of a main body, wherein an exposed end of the conductive wire is visible through the connection window when the insulated wire is properly connected to the connecting insert.

10. A shuttle assembly configured to connect an insulated wire to a contact terminal, the shuttle assembly comprising:
a connecting insert defining an exposed wire-crimping chamber, wherein the connecting insert is configured to receive an exposed end of a conductive wire, wherein the connecting insert is configured to be crimped to the exposed end of the conductive wire, wherein the connecting insert is configured to break through aluminum oxides of the exposed end of the conductive wire, wherein the connecting insert comprises (a) a wire-connection confirmation lever that is positioned within a channel formed through a first portion of a main body, wherein the wire-connection confirmation lever comprises (i) a flexible root that flexibly connects to the main body; (ii) an inwardly-canted beam that connects to the flexible root, wherein the inwardly-canted beam extends into the exposed wire-crimping chamber toward a longitudinal axis; and (iii) a linear extension beam that connects to the inwardly-canted beam, wherein the linear extension beam outwardly angles away from the longitudinal axis; (b) an exterior wall connected to an end cap, wherein the exposed wire-crimping chamber is defined between the exterior wall and the end cap, and wherein one or both of a plurality of openings are formed through or a plurality of protrusions extend from one or both of the exterior wall or the end cap, and (c) a connection window formed through a second portion the main body; and
a seal member integrally formed with and connected to the connecting insert, wherein the seal member is configured to be crimped to an insulating cover of the insulated wire.

11. The shuttle assembly of claim 10, wherein a single crimp crimps the connecting insert to the exposed end of the conductive wire and the seal member to the insulating cover.

12. The shuttle assembly of claim 10, wherein the shuttle assembly is configured to connect to the insulated wire to form a conductive wire assembly before connecting to the contact terminal.

13. The shuttle assembly of claim 10, wherein the shuttle assembly is configured to be inserted into a crimping chamber of a contact terminal before connecting to the insulated wire.

14. The shuttle assembly of claim 10, wherein an exposed end of the conductive wire is visible through the connection window when the insulated wire is properly connected to the connecting insert.

15. The shuttle assembly of claim 10, wherein a distal tip of the linear extension beam is flush or below an outer wall portion of the main body when the insulated wire is properly connected to the connecting insert, and wherein the distal tip outwardly extends beyond the outer wall portion of the main body when the insulated wire is improperly connected to the connecting insert.

16. A shuttle assembly configured to connect an insulated wire to a contact terminal, the shuttle assembly comprising:
a connecting insert defining an exposed wire-crimping chamber, wherein the connecting insert is configured to receive an exposed end of a conductive wire, wherein the connecting insert is configured to be crimped to the exposed end of the conductive wire, wherein the connecting insert include an oxide-permeating mesh structure that is configured to break through aluminum oxides of the exposed end of the conductive wire, wherein the connecting insert comprises:
a wire-connection confirmation lever that is positioned within a channel formed through a first portion of a main body, wherein the wire-connection confirmation lever comprises (a) a flexible root that flexibly connects to the main body, (b) an inwardly-canted beam that connects to the flexible root, wherein the inwardly-canted beam extends into the exposed wire-crimping chamber toward a longitudinal axis, and (c a linear extension beam that connects to the inwardly-canted beam, wherein the linear extension beam outwardly angles away from the longitudinal axis, wherein a distal tip of the linear extension beam is flush or below an outer wall portion of the main body when the insulated wire is properly connected to the connecting insert, and wherein the distal tip outwardly extends beyond the outer wall portion of the main body when the insulated wire is improperly connected to the connecting insert; and
a connection window formed through a second portion the main body; and
a seal member integrally formed with and connected to the connecting insert, wherein the seal member is configured to be crimped to an insulating cover of the insulated wire.

* * * * *